(12) United States Patent
Gorodilov

(10) Patent No.: US 10,430,448 B2
(45) Date of Patent: Oct. 1, 2019

(54) COMPUTER-IMPLEMENTED METHOD OF AND SYSTEM FOR SEARCHING AN INVERTED INDEX HAVING A PLURALITY OF POSTING LISTS

(71) Applicant: YANDEX EUROPE AG, Lucerne (CH)

(72) Inventor: Alexey Anatolievich Gorodilov, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 600 days.

(21) Appl. No.: 14/903,697

(22) PCT Filed: Jul. 8, 2014

(86) PCT No.: PCT/IB2014/062955
§ 371 (c)(1),
(2) Date: Jan. 8, 2016

(87) PCT Pub. No.: WO2015/004607
PCT Pub. Date: Jan. 15, 2015

(65) Prior Publication Data
US 2016/0162574 A1    Jun. 9, 2016

(30) Foreign Application Priority Data

Jul. 8, 2013   (WO) ................ PCT/RU2013/000580

(51) Int. Cl.
*G06F 16/33*     (2019.01)
*G06F 16/31*     (2019.01)
(Continued)

(52) U.S. Cl.
CPC ........ *G06F 16/3338* (2019.01); *G06F 16/319* (2019.01); *G06F 16/338* (2019.01);
(Continued)

(58) Field of Classification Search
None
See application file for complete search history.

(56) References Cited

U.S. PATENT DOCUMENTS 7,599,938 B1   10/2009   Harrison, Jr.
8,359,326 B1    1/2013   Garg et al.
(Continued)

OTHER PUBLICATIONS

International Search Report from PCT/IB2014/062955; Blaine R. Copenheaver; dated Dec. 31, 20145.

*Primary Examiner* — Ashish Thomas
*Assistant Examiner* — Mellissa M. Ohba
(74) *Attorney, Agent, or Firm* — BCF LLP

(57) ABSTRACT

Method of searching an inverted index having a plurality of posting lists, comprising: receiving a search query to be searched including search terms; effecting a search of posting lists to yield search results, the posting lists associated with the search terms and including a plurality of a first type of postings being a reference to a data item actually containing the search term with which that posting list is associated, the search results including result items missing one of the search terms; sending the first search results; receiving an indication of a user-selected result item, the user-selected result item being the result item missing one of the search terms; effecting insertion, into the posting list associated with the missing one of the search terms in the user-selected result item, of a second-type of posting being a reference to the user-selected result item missing that search term.

24 Claims, 5 Drawing Sheets

(51) Int. Cl.
*G06Q 10/10* (2012.01)
*G06F 16/951* (2019.01)
*G06F 16/338* (2019.01)

(52) U.S. Cl.
CPC ........ *G06F 16/3334* (2019.01); *G06F 16/951* (2019.01); *G06Q 10/10* (2013.01)

(56) References Cited

U.S. PATENT DOCUMENTS

| | | | | |
|---|---|---|---|---|
| 8,364,684 | B2* | 1/2013 | Hornkvist | G06F 16/316 |
| | | | | 707/741 |
| 8,914,377 | B2* | 12/2014 | Hornkvist | G06F 16/316 |
| | | | | 707/741 |
| 9,183,323 | B1* | 11/2015 | Shaw | G06F 17/30646 |
| 9,773,035 | B1* | 9/2017 | Ploshykhyn | G06F 17/30336 |
| 10,078,697 | B2* | 9/2018 | Popov | G06F 9/48 |
| 2006/0161520 | A1* | 7/2006 | Brewer | G06F 17/3064 |
| 2007/0118518 | A1 | 5/2007 | Wu et al. | |
| 2007/0282811 | A1 | 12/2007 | Musgrove | |
| 2009/0254523 | A1 | 10/2009 | Lang et al. | |
| 2011/0087684 | A1 | 4/2011 | Junqueira et al. | |
| 2013/0091166 | A1 | 4/2013 | Stiffelman et al. | |
| 2013/0159315 | A1* | 6/2013 | Hornkvist | G06F 16/316 |
| | | | | 707/741 |
| 2015/0186519 | A1* | 7/2015 | Popov | G06F 9/48 |
| | | | | 707/723 |
| 2016/0162574 | A1* | 6/2016 | Gorodilov | G06Q 10/10 |
| | | | | 707/722 |
| 2017/0262481 | A1* | 9/2017 | Ploshykhyn | G06F 17/30336 |

\* cited by examiner

COMPUTER-IMPLEMENTED METHOD OF AND SYSTEM FOR SEARCHING AN INVERTED INDEX HAVING A PLURALITY OF POSTING LISTS

CROSS-REFERENCE

None

FIELD

The present technology relates to computer-implemented methods of and systems for searching an inverted index having a plurality of posting lists.

BACKGROUND

Today's large data centers manage collections of data comprising billions of data items. In such large collections of data items, searching for particular items that meet the conditions of any given search query is a task that consumes a significant amount of computing resources and takes a noticeable amount of time.

Search Engines—General Discussion

Typically, in building a search-efficient data collection management system, data items are indexed according to some or all of the possible search terms that may be contained in search queries. Thus, conventionally an "inverted index" of the data collection is created, maintained, and updated by the system. The inverted index will comprise a large number of "posting lists" to be reviewed during execution of a search query. Each posting list corresponds to a potential search term and contains "postings", which are references to the data items in the data collection that include that search term (or otherwise satisfy some other condition that is expressed by the search term). For example, if the data items are text documents, as is often the case for Internet (or "Web") search engines, then search terms are individual words (and/or some of their most often used combinations), and the inverted index comprises one posting list for every word that has been encountered in at least one of the documents.

Search queries, especially those made by human users, typically have the form of a simple list of one or more words, which are the "search terms" of the search query. Every such search query may be understood as a request to the search engine to locate every data item in the data collection containing each and every one of the search terms specified in the search query. Processing of a search query will involve searching through one or more posting lists of the inverted index. As was discussed above, typically there will be a posting list corresponding to each of the search terms in the search query. Posting lists are searched as they can be easily stored and manipulated in a fast access memory device, whereas the data items themselves cannot (the data items are typically stored in a slower access storage device). This generally allows search queries to be performed at a much higher speed.

QIR & QSR

Typically, each data item in a data collection is numbered. Rather than being ordered in some chronological, geographical or alphabetical order in the data collection, data items are commonly ordered (and thus numbered) within the data collection in descending order of what is known in the art as their "query-independent relevance" (hereinafter abbreviated to "QIR"). QIR is a system-calculated heuristic parameter defined in such a way that the data items with a higher QIR value are statistically more likely to be considered by a search requester of any search query as sufficiently relevant to them. The data items in the data collection will be ordered so that those with a higher QIR value will be found first when a search is done. They will thus appear at (or towards) the beginning of the search result list (which is typically shown in various pages, with those results at the beginning of the search result list being shown on the first page). Thus, each posting list in the inverted index will contain postings, a list of references to data items containing the term with which that posting list is associated, with the postings being ordered in descending QIR value order. (This is very commonly the case in respect of Web search engines.)

It should be evident, however, that such a heuristic QIR parameter may not provide for an optimal ordering of the search results in respect of any given specific query, as it will clearly be the case that a data item which is generally relevant in many searches (and thus high in terms of QIR) may not be specifically relevant in any particular case. Further, the relevance of any one particular data item will vary between searches. Because of this, conventional search engines implement various methods for filtering, ranking and/or reordering search results to present them in an order that is believed to be relevant to the particular search query yielding those search results. This is known in the art as "query-specific relevance" (hereinafter abbreviated "QSR"). Many parameters are typically taken into account when determining QSR. These parameters include: various characteristics of the search query; of the search requester; of the data items to be ranked; data having been collected during (or, more generally, some "knowledge" learned from) past similar search queries.

Thus, the overall process of executing a search query can be considered as having two broad distinct stages: A first stage wherein all of the search results are collected based (in part) on their QIR values, aggregated and ordered in descending QIR order; and a second stage wherein at least some of the search results are reordered according to their QSR. Afterwards a new QSR-ordered list of the search results is created and delivered to the search requester. The search result list is typically delivered in parts, starting with the part containing the search results with the highest QSR.

Typically, in the first stage, the collecting of the search results stops after some predefined maximum number of results has been attained or some predefined minimum QIR threshold has been reached. This is known in the art as "pruning"; and it occurs, as once the pruning condition has been reached, it is very likely that the relevant data items have already been located.

Typically, in the second stage, a shorter, QSR-ordered, list (which is a subset of the search results of the first stage) is produced. This is because a conventional Web search engine, when conducting a search of its data collection (which contains several billions of data items) for data items satisfying a given search query, may easily produce a list of tens of thousands of search results (and even more in some cases). Obviously the search requester cannot be provided with such an amount of search results. Hence the great importance of narrowing down the search results actually provided to the requester to a few tens of result items that are potentially of highest relevance to the search requester.

The Quorum Rule

Conventional Web search engines face a problem, however, in that human search requesters may express their search queries in an imprecise or sub-optimal way. For example, a search query may contain a search term T (e.g.

"perambulator") that relates to the "theme" of the search (e.g. "baby carriages"—the search requester is looking for some information related to baby carriages) instead of the more common expression "strollers". Because the expression "perambulator" is much less common in every day usage than the expression "strollers", many data items that would actually be relevant search results (with respect to the theme of the search) would not actually be located in a specific search that required the presence of the world "perambulator" in order to be a result item, because they contain the expression "stroller" instead of the search term "perambulator". Thus, in the first (e.g. result item collecting) stage of the search, many data items relevant to the theme of the search would not even be included in the search result list, because they would not contain the term T.

To handle this issue (and for other reasons which are not relevant to the present discussion), conventional search engines are often configured to search not only for data items including occurrences of each one of the search terms of the search query, but also to search for additional data items that lack one or more of search terms (e.g. less significant search terms), while nonetheless containing all of the others of the search terms (e.g. more significant search terms). This is known in the art as "the quorum rule".

In a very general form, the quorum rule consists in heuristically assigning different weights to each of the individual search terms $T_1, T_2, \ldots T_n$ in a search query, and setting a threshold "quorum value" that is less than the total weight of all of the search terms (i.e. the sum of the individual weights of each and every one of the search terms). Data items that attain the search quorum weight value are considered as valid search results notwithstanding the fact that they may be lacking one or more of (e.g. the less significant) search terms (in this example the "less significant" search terms being those terms having the least weights). (The search quorum weight value of any particular data item with respect to any particular search is the sum of the weights of the search terms actually found in that data item.)

As an example, a very simple form of the application of the quorum rule that may be used for the purposes of illustration may be as follows: The search terms of a search query may be divided into insignificant search terms (e.g. words very uncommonly used in American English, words that are extremely commonly used in American English, prepositions, conjunctions, articles, auxiliary verbs, etc.) and significant search terms (e.g. all search terms other than the insignificant search terms). The total of number of significant search terms in the search query may then be represented by the variable K, and each of the significant search terms may then be assigned an equal weight of 1/K. A threshold quorum value may be established as ⅔. Thus, any data item whose weight with respect to a particular search query is at least ⅔ will qualify as a search result for that search query; and any data item whose weight is less than ⅔ will not qualify as a search result for that search query. (Thus, with respect to the above example, a data item might qualify as a search result with respect to a search containing the search term "perambulator" (a word very uncommonly used in American English) were it to contain all of the search terms of the search query even if it were missing the word "perambulator".)

Applying the quorum rule at the first stage of a search (i.e. the search result item collection stage) generally increases the total number of search results collected (as compared with the case where only those data items including every one of the search terms are included in the search results) because in this case not all the search terms need appear in a data item for that data item to be a result of the search. Thus, applying the quorum rule at the first stage of the search makes the second stage of the search process (QSR-ranking) even more important, yet at the same time more difficult to perform, as there are many more data items than would have been the case had the quorum rule not been applied. To handle this problem, conventional search engines implement ranking algorithms based on machine learning principles, using not only information that can be deduced from the search query then currently being executed, but also using a large amount of information collected from previous search queries.

Click-Through Data

In this respect, one very important type of such information from previous search queries is what is termed "click-through" data. At the end of any search query execution, the search requester is usually presented with a search engine result page ("SERP") that shows a portion of the search results. On the SERP, each data item being a search result is typically shown with its title, a hyperlink to the data item's location on the Internet, and a "snippet" (a short citation from the body of the data item typically containing some or all of the search terms of the search query). The information shown on the SERP can be used by the search requester in selecting the data items most interesting to them for further inspection. Typically, the search requester selects just a few of the data items, by clicking on their hyperlinks, to open them for further reading. Thus, many other data items are left alone without too much attention having been paid to them. While not every data item clicked on ("clicked through to") by the search requester will be considered by them as an interesting data item, those "clicked through" data items can nevertheless be considered on average as a group as being of greater interest to the search requester than those data items not clicked through. Such clicked through data items can thus be considered as being of a higher QSR with respect to that search query than the non-clicked through data items.

Such "click through" data is conventionally stored in the search engine's database(s). This information can be very helpful for future similar search queries as it can be used later to improve the QSR-ranking of the search results (for future search queries with the same or mostly the same search terms). When ranking the search results of such a future search query, click-through data from past similar queries can be used to assign the clicked-through data items a higher QSR. Thus, such data items can be shown to the then current search requester before other data items having been found during the result collecting stage (the first stage) of the current search query but that were not clicked-through in the past in respect of similar search queries.

Search Engines—Server Types & Functionalities

In order to provide a better understanding of such conventional search engine systems, referring to FIG. 1, the following example is provided: A typical conventional Internet search engine 10, includes four different types of servers (or groups of servers), shown in FIG. 1 as "web-crawler" server 12, "indexing" server 14, "searching" server 16, and "query" server 18, which are each individually described below.

Web-crawler server 12 implements a conventional Internet "web crawler", whose function it is to seek out and collect copies of webpages from the World-Wide Web (shown as "Web" 28 in FIG. 1) and store each of those pages as "data items" in the "data items" database 20. For each data item, web-crawling server 12 calculates and stores in the data items database 20 a "query-independent relevance" ("QIR") value. (In some systems, this functionality may be carried out by a separate server that is independent of the web-crawler server 12.)

Indexing server 14 is a conventional indexing server that (re)numbers the data items in the data items database 20. (Indexing server 14 thus received the QIR value for each data item from the web-crawler server 12.) Indexing server 14 also creates and maintains an inverted index in the data items in the "inverted index" database 22. Thus, indexing server 14 is responsible for actually reviewing each data item and determining what key words are in the data item and then inserting a posting to the relevant posting lists in respect of that data item.

Searching server 16 is a conventional searching server that receives search queries from query server 18 (see below), performs searches across the inverted index stored in the inverted index database 22 in respect of such search queries, and builds a QIR-ordered search result list.

Query server 18 is a conventional query server that receives and parses search queries from search requesters (represented by personal computer 26); and for each search query received, query server 18 initiates a search operation by the searching server 16. Query server 18 obtains the QIR-ordered "search result list" from searching server 16 in respect of the search. Query server 18 calculates for at least some of the data items in the search result list a "query-specific relevance" ("QSR"), and query server 18 builds a QSR-ranked search result list in respect of the search. Query server 18 extracts a "title" and a query-specific "snippet" from the data items database 20 (not particularly shown in the drawings) for each data item in the search result list. Query server 18 delivers to the search requester 26 portions of the QSR-ranked search list, together with their titles and snippets. (Each of the aforementioned functionalities of query server 18 are conventional and are well known in the art.) As is also known in the art, query server 18 further records the search requester's actions of "clicking through" on some of the data items shown to them as part of the search results, and stores appropriate data regarding such click-throughs in its "query database" 24. Query server 18 also searches information regarding past queries in the query database 24 when preparing the search results for a current query and defines the QSR-ranking of at least some search results as a function of the information found in the query database 24 before delivering the search results to the search requester.

Search Engines—Server Operations

Having described the general overall functions of each of the servers 12, 14, 16, and 18, some of the specific operations of the servers 12, 14, 16 and 18 will now be described. In this respect, web-crawling server 12 implements a web crawler that (permanently or periodically—as the case may be) explores the World Wide Web finding new (or recently updated) web pages (illustrated by data path 30). For each such web page that is found a data item is created in the data items database 20 (illustrated by data path 32). In a typical conventional Internet search engine, each data item in the data items database 20 includes a local copy of the corresponding web page on the Internet, a hyperlink to the original web page on the Internet (also called its web address), and a set of data-item attributes that were assigned to the data item during the course of its processing by the search engine system 10. Some of these data-item attributes may be described herein, however others not mentioned herein may also be defined and used by various conventional search engines.

With respect to any new data item, the first operation carried out is to define that data item's QIR value. As QIR values are used for data items ordering, they are typically implemented as a numerical (although not necessarily an integerial) characteristic of a data item. A QIR value is calculated by the search engine system 10 using many different attributes of the data item itself (including, but not limited to, its title, creation date, original web page location, etc.), and using the number and qualities of references to that data item on other Web pages, and likely also using some "historical" data having been "learned" by the system 10 from data items having been previously entered into the system, from previously executed search queries, and other conventionally-used information. In this respect, there exist a few methods that are well-known in the art for defining a QIR value in a practical suitable manner. In most conventional Internet systems, the calculation of a QIR value for each new data item is performed by the web-crawler server 12; however in some others it is performed by a different server, such as, for example, indexing server 14 or a dedicated QIR server.

Each data item stored in the data items database 20 is known within the system 10 by its unique system-assigned identifier, which is typically an ordinal number. Typically the entire collection of data items managed by a large Internet search engine is too large to be contained on one database server, and thus it is customarily split into several database "shards". Where such is the case, each shard will typically have its own data item numbering scheme and its own logic for performing a search on its portion of the document database. When executing a search query each of the partial per-shard search result lists, once generated, are merged into one common QIR-ordered list, which is then QSR ordered.

Data items are numbered by the system 10 in descending order of their QIR, rather than in the order that they were obtained by the web-crawler server 12. Data items having the same QIR can be numbered in any order, for example in inverse chronological order (the latest data items being assigned lesser numbers, in order to be found before the earlier ones). Hence, if a newly received data item D appears to have its QIR value less than that of an existing data item (say #999), but greater than or equal to the QIR value of the next data item (#1000), then D will be assigned #1000, while the old #1000 will become #1001 and so on. Hence, both the data item numbers and the content of the inverted index (see below) are permanently and periodically updated. Typically the data item (re)numbering operation is performed by the indexing server 120, but this is not required to be the case.

Once a data item (e.g. D) is received by the web crawler server 12, stored in the data items database 20, assigned its QIR value, assigned its data item number (e.g. #1000), it is passed on to the indexing server 14 (data path 34 on FIG. 1) for further processing by the latter (bidirectional data path 36). The indexing server 14 manages its database 22 (bidirectional data path 38), which basically comprises an inverted index of the data item collection contained in the data items database 20.

Postings & Posting Lists

As was described hereinabove, the inverted index basically comprises a number of posting lists. The indexing server 14 inspects the new data item #1000, discerns in it various "searchable terms", and for each searchable term found in the data item it creates a new entry (e.g. a "posting") in the appropriate posting list.

A posting in a posting list basically includes a data item number (or other information sufficient to calculate a data item number), and optionally includes some additional data. Every posting list corresponds to a searchable term, and comprises a series of postings referencing each of those data items in the data items database 20 that contain at least one occurrence of that searchable term.

Additional data may also be found in a posting; for example, the number of occurrences of a given searchable term in a given data item; whether this search term occurs in the title of the data item, etc. This additional information may be different depending on the search engine.

Searchable terms are typically, but not exclusively, words or other character strings. A general use Web search engine typically deals with practically every word in a number of different languages, as well as proper names, numbers, symbols, etc. Also included may be "words" having commonly found typographical errors. In the present specification, any such searchable term may be referred to as a "word" or a "term". For each searchable term that has been encountered in at least one data item, the indexing server 14 updates the corresponding posting list, or creates a new one if the term is being encountered for the first time. Hence the total number of posting lists may be as large as a few million. The length of a given posting list depends on how commonly used the corresponding word is in the data items universe (e.g. on the Internet). A very commonly used word may have a posting list of as long as one billion entries (or even more—there is no limit). (In practical use, when the data items database 20 is split into several "shards", each shard maintains its own separate inverted index 22, thus greatly reducing the length of posting lists in each shard.)

In each posting list, data item postings are placed in an ascending order of their data item numbers, that is, in the descending order of their QIR. Hence, the process of indexing a new data item D is not limited to inserting the data item number of D, say #1000, into the posting list of every word $T_i$ occurring in D. Rather, when assigning to D an already existing data item number #1000, every existing posting in every posting list, to data item number equal or greater than #1000, must be updated (incremented by 1 in this example). In actuality, conventional search engines typically perform this update operation periodically for batches of data items having been received since the previous time that the inverted index database 22 was updated.

Conventional Execution of Search Queries

Data items stored in the data items database 20 and indexed in the inverted index database 22 can then be searched for. Again with reference to FIG. 1, search queries are made by human users ("search requesters" which are collectively depicted on FIG. 1 by an image of a personal computer 26) and are received by the query server 18 (data path 50 in FIG. 1). The query server 18 parses each search query received into its various search terms (which may include optionally dropping auxiliary words such as prepositions and conjunctions not to be searched for because of their ubiquity), and may also perform some other convention actions. For example, a search query $Q_1$, received at time $t_0$, may comprise four search terms $T_1$, $T_2$, $T_3$, $T_4$. This is denoted as $Q_1[T_1,T_2,T_3,T_4]$ in FIG. 2.

The query $Q_1$ is then passed by the query server 18 to the searching server 16 (data path 44). The latter basically operates on the inverted index database 22, that is, on the inverted index with its many posting lists. In this example, the search process, or execution of a search query, consists of finding the data item numbers of all those data items that contain occurrences of each search term specified in the search query (as was discussed above this is the simplest form of a search process; in a further example described below a quorum principle will be introduced). Typically this is done by exploring in parallel each of the posting lists corresponding to the search terms of the query, starting from the beginning of each posting list. In the present example, posting lists $P_1$, $P_2$, $P_3$, $P_4$ correspond to the search terms $T_1$, $T_2$, $T_3$, $T_4$ respectively (as shown on the upper part of FIG. 2). (In a more general manner the posting list corresponding to a term $T_n$ is denoted in this specification as $P_n$). A data item whose number is encountered in each posting list relevant to the search query is considered to be a search result (sometimes also conventionally called a "hit"), and is placed in a search result list as the search result list's then next element (i.e. after hits already having been placed in the result list). In this way, the search result list of a search query is in ascending order of data item numbers, and thus in descending order of QIR value.

This procedure of finding further search results stops either when reaching the end of one of the posting lists, or when some "pruning condition" (as was mentioned above) has been satisfied. In various conventional examples, the pruning condition might, for example, be defined by the query server 18 on a per query basis and provided with each query Q by the query server 18 to the searching server 16; alternatively the pruning condition might be fixed with respect to the system and be the same for all queries. In either case, the pruning condition could be expressed, for example, as a maximum number of data items in the search result list, or as a minimum QIR value for a data item to be included in the search result list, or in another different conventional matter. In any case, application of a pruning condition is supposed to "pick" the best results in terms of their QIR.

The search result list prepared by the search server 16 for a given query, e.g. for $Q_1$, is then sent back by searching server 16 to the query server 18 (data path 42). (In the following description and in FIGS. 2 and 3 the search result list for a query $Q_m$ is denoted as "$R(Q_m)$". In terms of two-stage query execution described above, the first stage—collection of search results—is now terminated, and the second stage, that of ranking, or reordering, of the search result list starts. In this respect, the query server 18, before delivering the results to the search requester, reorders them in a way presumably most suitable for this particular given query, by placing at the highest positions in the list those search results (data items) that have the highest query-specific relevance (QSR) for that particular given query. This QSR-ranking and reordering of the originally QIR-ordered search result list is probably the most sophisticated operation performed by a Web search engine, and the one most influencing final user (e.g. search requester) satisfaction.

In order to define in a best QSR ranking for a particular given query, information from many different sources is taken into account at the same time. Part of the information used assessing the QSR of a data item may be found in the data item itself; for example, the total number of occurrences in the data item of each search term of the given search query; occurrences of two or more of the search terms found in close proximity to each other (e.g. in the same phrase), or, yet better, following each other in the same order as in the search query; search terms found in the title of the document, etc. However, all these are limited-scope criteria that might not necessary reflect the level of "user satisfaction" with a given data item in the context of a given particular query.

Hence, some conventional Web search engines make use of historical information collected from a large quantity of previously executed search queries, and stored in a database. This "query database" is shown on FIG. 1 in association with reference number 24, and accessed by the query server 18 via bidirectional data-path 46. As is known in the art, from each query, diverse information can be extracted, stored and processed, and then used for better QSR-ranking of results for the next query. In the context of the present example, only "click-through" data as was briefly discussed above is considered to be relevant. In this respect, a user $U_1$ having made a search query, say, $Q_1[T_1,T_2,T_3,T_4]$, receives from the query server 18 a list of search results having been found for the query by the searching server 16 and further having been ranked by the query server 18 (as was previously discussed above). In many cases the list is very long, so it is sent to the user in portions (or "pages") of, for example, 20 entries each. Every entry is "clickable", that is, if clicked by the user with their mouse or other pointing device, causes the data item to open, for example, in another window or another tab of the browser application on the user's computer. It is likely beneficial for the user to be provided with a quick glance at each of the search results prior to opening them, so that they do not waste their time having to open data item after data item trying to locate the right one. To that end, the query server 18 typically provides the user with a "snippet", a short citation (or a few yet shorter fragments collected together) from the data item where the requested search terms occur in a presumably self-explanatory context. After looking at the snippet (as well as the other information provided) the user can decide whether to open the data item (by "clicking through" to it), or not.

Illustration of Conventional Use of Click-Through Data

Upon opening a data item, the user can look at it more carefully and decide whether it is definitely of interest to them or not. While the search engine has no way of explicitly "knowing" whether or not the data item is of interest to the user, the search engine can record the mere fact of the user having clicked-through to a given data item appearing on the search result page. This is because the search result page is typically provided to the user by the search engine in a Web application that is typically programmed in a way that every "click-through" action on the page is first sent back to the search engine (in the present example to query server 18 of the system 10). The query server 18 then redirects the user to the web-page of the requested data item (or, alternatively, shows them a copy of the data item stored in the data items database 20). In this way, the query server 18 is capable of recording all the click-through actions performed by users on search result pages provided to them.

It has been statistically verified that, among search results of a query that have been effectively shown to the query issuer, those that have been clicked-through by them were on average of more interest to them than those not clicked-through. Moreover, the last clicked-through data item in the list, that is, the one after which the user stopped further inspection of the list and did not click through to any other items, has proven to be on average of yet more interest to the user than all the previously clicked-through documents. These statistical considerations and "click-through history" are used for better ranking a search result list for every next search query, by using the "click-through history" from past search queries.

In FIG. 2, the query database 18 stores click-through data from past queries in the form of records $<D_k; Q_m[T_1,T_2, T_3, \ldots T_n]>$ indicating that the document $D_k$ had been clicked through by the issuer of the query $Q_m[T_1,T_2, T_3, \ldots T_n]$ when he/she was exploring the search results for that query. Optionally, as is known in the art, there could also be recorded (and then used at same later time) data with respect to the search requester (e.g. their IP address), the query execution time; etc. The above collection of records represents a database that can be sorted by documents clicked through, or by some or all the search terms used in queries, or in any other way.

In FIG. 2, for example, the user $U_1$ issues a query $Q_1[T_1,T_2,T_3,T_4]$, which is executed by the searching server 16 by examining the posting lists $P_1, P_2, P_3, P_4$ of the search terms $T_1, T_2, T_3, T4$ (respectively) of the search query $Q_1$. Illustratively, a data item $D_1$ (more exactly, a posting (i.e. a reference) to $D_1$) is found in each of these posting lists; hence $D_1$ is included in the search result list $R(Q_1)$ for the query $Q_1$. The search result list is, after some QSR reordering, presented to the user $U_1$. The user $U_1$ clicks through the entry corresponding to the data item $D_1$ in the list, considering that it might be of interest to them. (The fact of a data item having been clicked through is schematically indicated on both FIG. 2 and FIG. 3 by an asterisk "*".) This information is stored in the query database 24 as a record $<D_1; Q_1[T_1, T_2, T_3, T_4]>$.

At some later point in time, by comparing queries with "almost the same" search terms, and/or with "mostly the same" search result lists, especially those with "mostly the same" subsets of their "clicked-through" results, the system 10 (namely, its query server 18) can establish some "degree of similarity" among past queries, and also between a next query, e.g. $Q_2$, and some of the past queries, e.g. $Q_0$. As how this occurs is both complicated and conventional the details thereof will not be discussed herein; what is important for present purposes is to understand how information from past queries similar to a current query $Q_2$ is conventionally used to help a search engine to deliver more appropriate results to the current search requester.

In this respect, if a then current query, e.g. $Q_2$, is found to be similar to some past query, e.g. $Q_1$, and if among the search results for $Q_2$ there is a data item $D_1$, for which a record $<D_1; Q_1[\ldots]>$ exists in the query database 24, signifying that the document $D_1$ was among the results for $Q_1$ as well, and, moreover, had been clicked through by a past issuer of $Q_1$, then the data item $D_1$ is considered as being of higher QSR for $Q_2$ than other results for $Q_2$ with same or similar other characteristics. In other words, the above criterion of "having been clicked through in one or more past similar queries", while not decisive, is used as one of the criteria capable of increasing the QSR of $D_1$ for $Q_2$, and hence of pushing $D_1$ higher in the ordered list of search results for $Q_2$. Thus $D_1$ will be shown to the search requester in the search result list at an earlier time (i.e. at a higher position in the list) than it would have been had $D_1$ not previously been clicked through.

This is illustratively shown on FIG. 2. A user $U_2$ (which may be the same as $U_1$ or may be another user) issues a search query $Q_2[T_1,T_2,T_4,T_5]$ that differs from the previously considered query $Q_1[T_1,T_2,T_3,T_4]$ in that it does not include the search term $T_3$, but rather includes some other search term $T_5$ instead. Again, the searching server 16 looks through the posting lists corresponding to the search terms, this time the posting lists $P_1, P_2, P_4, P_5$ corresponding to search terms $T_1, T_2, T_4, T_5$ of the query $Q_2$. (In FIG. 2 this is shown in a second image of the indexing database 22, denoted 22(2).) Illustratively, the same document $D_1$ is again found in each of the posting lists; hence $D_1$ is included in the search result list $R(Q_2)$ for query $Q_2$. However, this time the result list $R(Q_2)$ contains too many other documents of presumably higher relevance to the user $U_2$, for the document $D_1$ to be even shown to them. This is illustratively depicted on FIG. 2 by placing $D_1$ in a lower position within the list $R(Q_2)$.

In according to conventional use of click-through data, however, the query server 18 (not shown on FIG. 2), before presenting the result list $R(Q_2)$ to the user $U_2$, looks up in the query database 24, and finds there (amongst probably other information) the previously stored record $<D_1;Q_1[T_1,T_2,T_3,T_4]>$ showing that the document $D_1$ had been clicked through in one of the previous queries, namely in the query $Q_1[T_1,T_2,T_3,T_4]$ that differs from the then present query $Q_2[T_1,T_2,T_4,T_5]$ by just one of their four search terms. Considering that the fact that it had been clicked through brings some additional value to $D_1$, the query server 18 now upgrades the document $D_1$ to a higher position in the list $R(Q_2)$, as shown by a dotted-arc arrow on FIG. 2, such that $D_1$ will now be presented to user $U_2$.

Illustration of Conventional Use of the Quorum Rule

Before continuing on, it is helpful to have an understanding of another concept used in the prior art (and briefly introduced herein above): that of a quorum in multi-criteria data search. Generally, a quorum-based search means that, when executing a search for a multi-criteria query, search results are not only those data items that satisfy all the criteria of a search query, but also other data items that possibly satisfy just some of the criteria, according to a "quorum rule".

The quorum rule is typically expressed in terms of a minimum value $w_q$ for the sum of "weights" of all the search criteria that are satisfied for a given data item, or, more specifically, of all the search terms in the query that are contained in that data item. So, if for a query $Q_m[T_1, T_2, \ldots T_n]$ with n terms, the respective weights of the terms are established at $w_1, w_2, \ldots w_n$, then $w_q$ will be fixed at some value lower than the sum $w_1+w_2+\ldots+w_n$, so that some of the data items that do not contain each and every search term $T_1, T_2, \ldots T_n$, will nevertheless be considered as valid search results, provided that the sum of weights of all terms that such data item does contain is still not lower than the quorum value $w_q$.

In more precise terms, let occ(T,D) be a Boolean function indicating the presence of a term T in a data item D, which is equal to 1 when T occurs at least once in D, and is equal to 0 otherwise;

let w(T,Q) be the weight of a term T in a query Q containing that term; and let w(D, Q) be a weighting function of a document D for a query $Q[T_1, T_2, \ldots T_n]$, defined as:

$$w(D,Q)=w(T_1,Q)\cdot occ(T_1,D)+w(T_2,Q)\cdot occ(T_2,D)+\ldots+w(T_n,Q)\cdot occ(T_n,D).$$

Then a quorum condition means, for a quorum value $w_q$, that every document D, for which $w(D,Q) \geq w_q$, is considered a search result for Q.

As was discussed hereinabove, the simplest form of a quorum rule corresponds to a case where all the search terms in a query have the same weight, and the quorum value is established so as to allow some proportion of terms to be missing in a document. For example, all terms in an n-term query Q may be defined as having the same weight 1 (so that their total weight is n), and the quorum value $w_q$ is established at ⅔·n. Another form of functionally the same quorum rule may consist in assigning, for a query $Q[T_1,T_2, \ldots T_n]$ with any number n of search terms, $w(T_1,Q)=w(T_2,Q)=\ldots=w(T_n,Q)=1/n$ (so that their total weight is 1), and establishing $w_q=⅔$. In the subsequent examples this simple form of a quorum rule will mostly be used.

EXAMPLE

As was briefly discussed above, in the context of a Web search, the need for defining and applying a quorum rule appears because users often express their search queries in a way that some of the search terms, while indeed being related to the "theme" of a given search query, do not in fact textually appear in some of data items that may potentially be of high interest to them. This concept is shown again below, but this time with a more detailed example.

Consider the following search query: "hybrid cars fuel consumption" denoted as $Q_3$['hybrid', 'cars', 'fuel', 'consumption'] or simply as $Q_3$. Suppose the user wants to get a comparison of hybrid cars by their fuel consumption levels. However, many Web-pages that might be potentially interesting to the user contain no textual occurrences of the word "consumption". Rather, they may contain the expression "miles per gallon", the abbreviation "mpg", such qualitative terms as "economy" or "efficiency", or any number of other possibilities. Hence, the search term "consumption", were its textual presence to be definitely required, would block all such web pages from appearing in the search result list for the query $Q_3$. In accordance with the above-discussed simplest quorum rule (the one with equal weights for all search terms and having a quorum value of ⅔), however, assuming in the above query the same weight ¼ is assigned for each of its four search terms, every data item including only 3 of those 4 search terms (including those not including the term "consumption"—but including the other three search terms), will have a total weight of ¾. ¾ being higher than the quorum value ⅔, such documents will be included in the search result list.

The issuer of the query $Q_3$, say $U_3$, when going through the search results list and reading the titles and snippets of the individual results, will likely disregard to those data item that do not deal with "hybrid" cars, only with ordinary cars (such documents may have been included in the search result list because, while they lacked the search term "hybrid", they did contain the three other search terms of the query $Q_3$). By contrast, a data item about "hybrid car ratings fuel efficiency" (although not including the term 'consumption'), e.g. the above data item $D_2$, might attract their interest. Were they then to click on the hyperlink to open the data item $D_2$, this "click through" operation would be intercepted and recorded by the query server 18. A record of this click-through operation would likely be stored in the query database 24 to be used at a later time for better QSR-ranking of future queries' search results.

This example will be returned to below in the present specification in discussing implementations of the present technology.

Although, via the above described procedures, conventional search engines do provide search requesters with relevant search results, there is always room for improving search engine technology in this regard.

SUMMARY

It is an object of the present technology to provide an improved search engine user experience, at least in one aspect, as compared with at least some conventional search engines.

In this respect it has been realized there are other potential uses of click-through data (other than the conventional use described hereinabove), that are not being made in conventional search engines. Specifically, as was described above, click-through data is currently conventionally being considered in the second stage of the search (the QSR-ranking stage of the search results). Click-through data is not currently being considered at the first stage of the search (the collection of the search results). Without wishing to be bound by any particular theory, one reason that this may never have been done previously is that in the context of the extremely stringent time requirements the search engine is under to produce the search results, only posting lists are inspected, and no other information is taken into account.

It has been realized, however, that in some instances, because the click-through data is not being used during the first stage of the search, data items that might be potentially relevant (based on the click-through data and thus the past history of search queries) are being not included in the search results because such data items were never collected during the first stage of the search. (The use of the click-through data at the second stage does not remedy this issue, the click-through data at that stage is only used to rank the search results having been collected during the first stage and not to include other uncollected data items in the search results.)

The following example provides an illustration: A first search query $Q_3$ has search terms $[T_1, T_2, T_3, T_4]$, with each of these terms being a "significant term". A search is conducted with respect to $Q_3$ during which the simple quorum rule described above wherein each of the search terms is of equal weight (each term thus having a weight of ¼) and wherein the quorum value of ⅔ is employed. A document $D_2$ containing the terms $T_1, T_2, \& T_3$, but not $T_4$, is collected as a search result (which would be the case as the weight of $D_2$ (¾) is greater than the quorum value (⅔)). Document $D_2$ is clicked-through by the search requester.

A second, later, search query $Q_4$ has search terms $[T_1, T_2, T_4, T_5]$, which differs from $Q_3$ in that $Q_4$ contains $T_5$ instead of $T_3$. Each of the search terms of $Q_4$ is a significant term. As was discussed above, document $D_2$ contains the terms $[T_1, T_2, T_3]$. It does not contain the term $T_4$; nor does it contain the term $T_5$ either. Thus, in a conventional search engine, document $D_2$ would not be included in the search results of a search conducted in respect of $Q_4$ because, as document $D_2$ only contains $T_1$ and $T_2$, its weight would be ½, which would be less than the quorum value of ⅔. Document $D_2$ would thus simply not be collected as a search result during the first stage of the search process, and would never been shown to a user in the search results list.

It may be the case, however, that document $D_2$ would be a good candidate to be presented as a search result in respect of $Q_4$, as it had previously been clicked-through in respect of $Q_3$, which differs from $Q_4$ by just one term ($T_5$ instead of $T_3$). As was discussed above, however, this is something that conventional search engines cannot do. The present technology aims to ameliorate, at least in part, this situation.

Thus, in one aspect, implementations of the present technology provide a computer-implemented method of searching an inverted index having a plurality of posting lists, the method comprising:

receiving, from a first client device by at least one server, a first search query to be searched, the first search query including a first plurality of search terms;

effecting, by the at least one server, a first search of a first plurality of posting lists to yield first search results, each of the first plurality of posting lists associated with a one of the first plurality of search terms, each of the first plurality of posting lists including a plurality of a first type of postings, the first type of posting being a reference to a data item actually containing the search term with which that posting list is associated, the first search results including a first plurality of result items, the first search results including a result item missing one of the first plurality of search terms;

sending, by the at least one server to the first client device, at least a portion of the first search results including the result item missing one of the first plurality of search terms;

receiving, from the first client device by the at least one server, an indication of a first user-selected result item, the first user-selected result item being the result item missing one of the first plurality of search terms;

effecting, by the at least one server, insertion, into the posting list associated with the missing one of the first plurality of search terms in the first user-selected result item, of a second-type of posting, the second-type of posting being a reference to the first user-selected result item missing that search term.

In some implementations, the computer-implemented method further comprises:

receiving, from a second client device by the at least one server, a second search query to be searched, the second search query containing a second plurality of search terms, one of the second plurality of search terms being the missing one of the first plurality of search terms in the first user-selected result item of the first plurality of result items; and effecting, by the at least one server, a second search of a second plurality of posting lists to yield second search results, each of the second plurality of posting lists associated with a one of the second plurality of search terms, one of the second plurality of posting lists being the posting list associated with the missing one of the first plurality of search terms in the first user-selected result item of the first plurality of result items and including the second-type of posting, and the second search including a consideration of the second-type of posting.

In some implementations, as a result of the consideration of the second-type of posting, the second search results include the first user-selected result item of the first search results.

In some implementations, effecting the second search includes assigning an item weight to each data item being considered during the second search; and each data item is included in the second search results only if its item weight is not less than a threshold item weight.

In some implementations, each one of the second plurality of search terms is assigned a search term weight; and wherein calculation of the item weight of each data item being considered includes a sum of the search term weights of those ones of the second plurality of search terms having one of the first-type of posting and the second-type of posting in respect of that data item in the one of the second plurality of posting lists associated with that one of the second plurality of search terms.

In some implementations, calculation of the item weight for each data item being considered includes a sum of a plurality of addends, the addends in respect of the first-type of postings being the search term weights of those ones of the second plurality of search terms having one of the first type of posting in respect of that data item in the one of the second plurality of posting lists associated with that one of the second plurality of search terms multiplied by a first-type of reduction factor in respect of that addend, the addends in respect of the second-type of posting being the search term weights of those ones of the second plurality of search terms having one of the second type of posting in respect of that data item in the one of the second plurality of posting lists associated with that one of the second plurality of search terms.

In some implementations, calculation of the item weight for each data item being considered includes a sum of a plurality of addends, the addends in respect of the first-type of postings being the search term weights of those ones of the second plurality of search terms having one of the first type of posting in respect of that data item in the one of the second plurality of posting lists associated with that one of the second plurality of search terms, the addends in respect of the second-type of posting being the search term weights of those ones of the second plurality of search terms having one of the second type of posting in respect of that data item in the one of the second plurality of posting lists associated with that one of the second plurality of search terms multiplied by a second-type of reduction factor in respect of that addend.

In some implementations, calculation of the item weight for each data item being considered includes a sum of a plurality of addends, the addends in respect of the first-type of postings being the search term weights of those ones of the second plurality of search terms having one of the first type of posting in respect of that data item in the one of the second plurality of posting lists associated with that one of the second plurality of search terms multiplied by a first-type of reduction factor in respect of that addend, the addends in respect of the second-type of posting being the search term weights of those ones of the second plurality of search terms having one of the second type of posting in respect of that data item in the one of the second plurality of posting lists associated with that one of the second plurality of search terms multiplied by a second-type of reduction factor in respect of that addend.

In some implementations, the second-type of reduction factor in respect of that addend is a function of a number of times that data item had been clicked-through in search results of previous search queries including the search term with which that one of the second plurality of posting lists is associated.

In some implementations, the first-type of reduction factor in respect of that addend is a function of a number of times that data item contains the search term with which that one of the second plurality of posting lists is associated.

In some implementations, a data item is included in the second search results only if a ratio of its second-type postings to its first-type postings is not greater than a threshold ratio In some implementations, the computer-implemented method further comprises:
  sending, by the at least one server to the second client device, at least a portion of the second search results including the first user-selected result item;
  receiving, from the second client device by the at least one server, an indication of a second user-selected result item, the second user-selected result item being the first user-selected result item;
  effecting, by the at least one server, modification in the posting list associated with the missing one of the second plurality of search terms of the second-type of posting to the first user-selected result item, to take into account that the first user-selected result item is also the second user-selected result item.

In another aspect, implementations of the present technology provide a system comprising at least one server, the at least one server having at least one computer processor, and a non-transient computer information storage medium storing program instructions that when executed by the at least one computer processor effect:
  receiving, from a first client device by at least one server, a first search query to be searched, the first search query including a first plurality of search terms;
  effecting, by the at least one server, a first search of a first plurality of posting lists to yield first search results, each of the first plurality of posting lists associated with a one of the first plurality of search terms, each of the first plurality of posting lists including a plurality of a first type of postings, the first type of posting being a reference to a data item actually containing the search term with which that posting list is associated, the first search results including a first plurality of result items, the first search results including a result item missing one of the first plurality of search terms;
  sending, by the at least one server to the first client device, at least a portion of the first search results including the result item missing one of the first plurality of search terms;
  receiving, from the first client device by the at least one server, an indication of a first user-selected result item, the first user-selected result item being the result item missing one of the first plurality of search terms;
  effecting, by the at least one server, insertion, into the posting list associated with the missing one of the first plurality of search terms in the first user-selected result item, of a second-type of posting, the second-type of posting being a reference to the first user-selected result item missing that search term.

In some implementations, the non-transient computer information storage medium further stores program instructions that when executed by the at least one computer processor effect:
  receiving, from a second client device by the at least one server, a second search query to be searched, the second search query containing a second plurality of search terms, one of the second plurality of search terms being the missing one of the first plurality of search terms in the first user-selected result item of the first plurality of result items; and
  effecting, by the at least one server, a second search of a second plurality of posting lists to yield second search results, each of the second plurality of posting lists associated with a one of the second plurality of search terms, one of the second plurality of posting lists being the posting list associated with the missing one of the first plurality of search terms in the first user-selected result item of the first plurality of result items and including the second-type of posting the second search, and the second search including a consideration of the second-type of posting.

In some implementations, as a result of the consideration of the second-type of posting, the second search results include the first user-selected result item of the first search results.

In some implementations, effecting the second search includes assigning an item weight to each data item being considered during the second search; and each data item is included in the second search results only if its item weight is not less than a threshold item weight.

In some implementations, each one of the second plurality of search terms is assigned a search term weight; and wherein calculation of the item weight of each data item being considered includes a sum of the search term weights of those ones of the second plurality of search terms having one of the first-type of posting and the second-type of posting in respect of that data item in the one of the second plurality of posting lists associated with that one of the second plurality of search terms.

In some implementations, calculation of the item weight for each data item being considered includes a sum of a plurality of addends, the addends in respect of the first-type of postings being the search term weights of those ones of the second plurality of search terms having one of the first type of posting in respect of that data item in the one of the second plurality of posting lists associated with that one of the second plurality of search terms multiplied by a first-type of reduction factor in respect of that addend, the addends in respect of the second-type of posting being the search term weights of those ones of the second plurality of search terms having one of the second type of posting in respect of that data item in the one of the second plurality of posting lists associated with that one of the second plurality of search terms.

In some implementations, calculation of the item weight for each data item being considered includes a sum of a plurality of addends, the addends in respect of the first-type of postings being the search term weights of those ones of the second plurality of search terms having one of the first type of posting in respect of that data item in the one of the second plurality of posting lists associated with that one of the second plurality of search terms, the addends in respect of the second-type of posting being the search term weights of those ones of the second plurality of search terms having one of the second type of posting in respect of that data item in the one of the second plurality of posting lists associated with that one of the second plurality of search terms multiplied by a second-type of reduction factor in respect of that addend.

In some implementations, calculation of the item weight for each data item being considered includes a sum of a plurality of addends, the addends in respect of the first-type of postings being the search term weights of those ones of the second plurality of search terms having one of the first type of posting in respect of that data item in the one of the second plurality of posting lists associated with that one of the second plurality of search terms multiplied by a first-type of reduction factor in respect of that addend, the addends in respect of the second-type of posting being the search term weights of those ones of the second plurality of search terms having one of the second type of posting in respect of that data item in the one of the second plurality of posting lists associated with that one of the second plurality of search terms multiplied by a second-type of reduction factor in respect of that addend.

In some implementations, the second-type of reduction factor in respect of that addend is a function of a number of times that data item had been clicked-through in search results of previous search queries including the search term with which that one of the second plurality of posting lists is associated.

In some implementations, the first-type of reduction factor in respect of that addend is a function of a number of times that data item contains the search term with which that one of the second plurality of posting lists is associated.

In some implementations, a data item is included in the second search results only if a ratio of its second-type postings to its first-type postings is not greater than a threshold ratio.

In some implementations, the non-transient computer information storage medium further stores program instructions that when executed by the at least one computer processor effect:
  sending, by the at least one server to the second client device, at least a portion of the second search results including the first user-selected result item;
  receiving, from the second client device by the at least one server, an indication of a second user-selected result item, the second user-selected result item being the first user-selected result item;
  effecting, by the at least one server, modification in the posting list associated with the missing one of the second plurality of search terms of the second-type of posting to the first user-selected result item, to take into account that the first user-selected result item is also the second user-selected result item.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
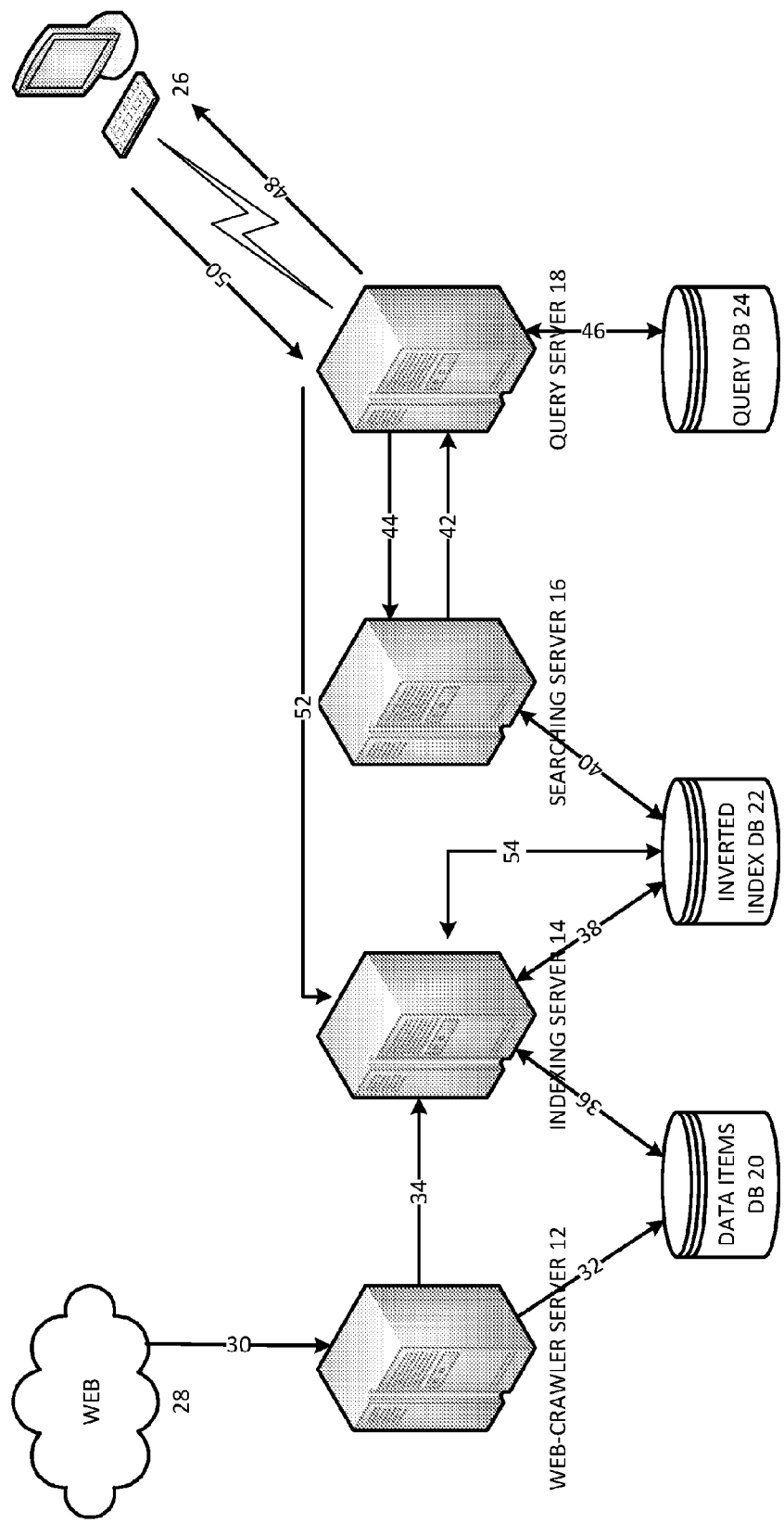
FIG. 1 is a schematic view showing (i) some of the various software and hardware components of an Internet search engine system being an implementation of the present technology, and (ii) some of the interactions and data transfers between those components.
Figure 2:
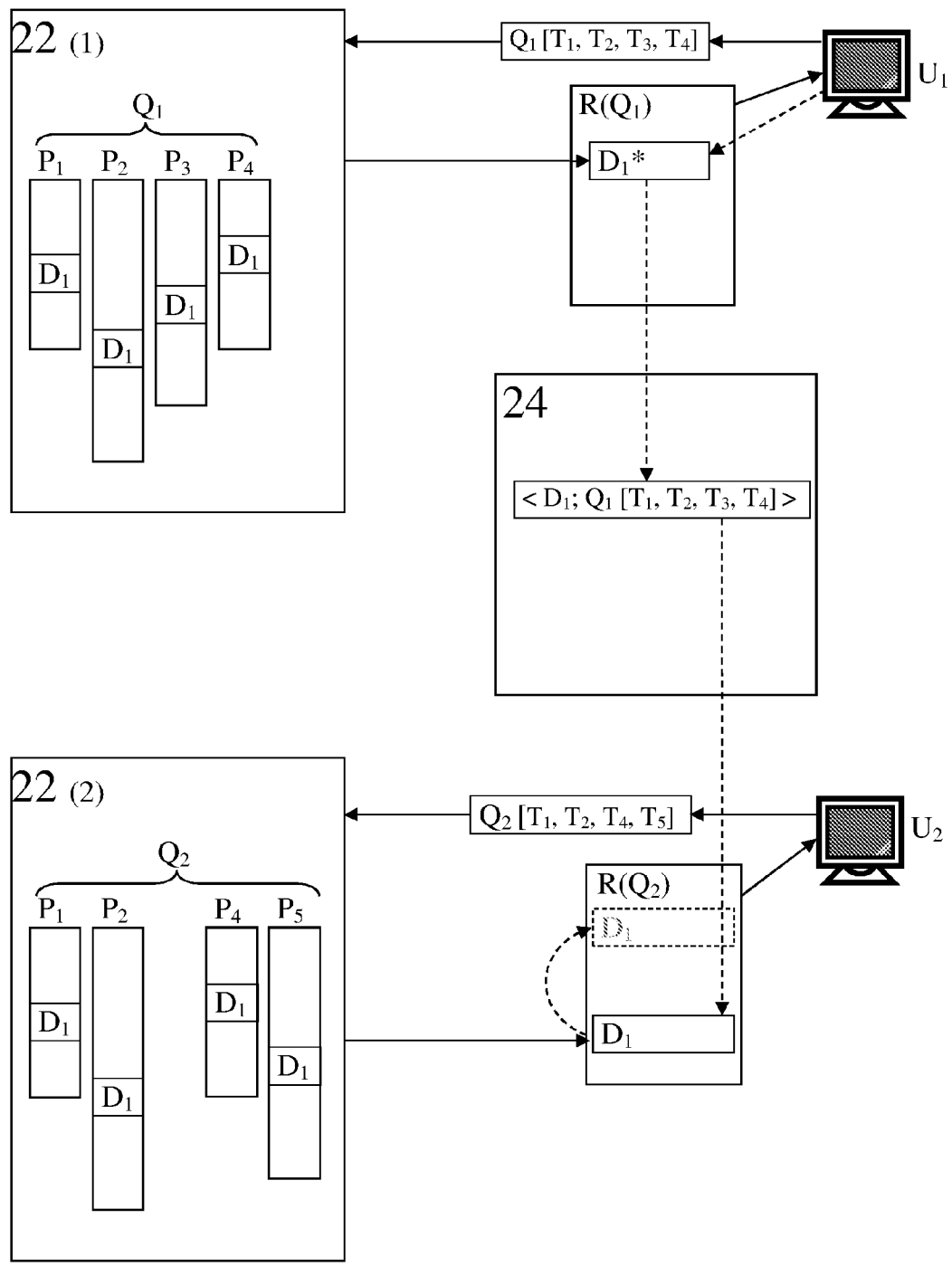
FIG. 2 schematically shows some prior art use of click-through information.

Referring again to FIG. 1, there is shown a diagram of an Internet search engine 10 including various networked computer systems and components in communication with one another via a communications network. It is to be expressly understood that the Internet search engine 10 is merely one implementation of the present technology. Thus, the description thereof that follows is intended to be only a description of an illustrative example of the present technology. This description is not intended to define the scope or set forth the bounds of the present technology. In some cases, what are believed to be helpful examples of modifications to Internet search engine 10 (or its components) may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the Internet search engine 10 provides a generally simple implementation of the present technology, and that has been presented in this manner as an aid to understanding. As persons skilled in the art would understand, various implementations of the present technology may be of a greater complexity. The internet search engine 10 employs convention server hardware in this implementation.

The above example in respect of $Q_3$, the search query: "hybrid cars fuel consumption" denoted as $Q_3$['hybrid', 'cars', 'fuel', 'consumption'] will be referred to again to illustrate an implementation of the present technology. In this respect, suppose the user wants to get a comparison of hybrid cars by their fuel consumption levels. However, many Web pages that might be potentially interesting to the user contain no textual occurrences of the word "consumption". Rather, they may contain the expression "miles per gallon", "liters per 100 kilometers", the abbreviation "mpg", the abbreviation "l/100 km" such qualitative terms as "economy" or "efficiency", or any number of other possibilities. Hence, the search term "consumption", were its textual presence to be definitely required, would block all such web pages from appearing in the search result list for the query $Q_3$. In accordance with the above-discussed simplest quorum rule (the one with equal weights of all terms and a quorum value of ⅔) however, assuming in the above query the same weight ¼ is assigned for each of its four search terms, every data item including only 3 of those 4 search terms (including those not including the term "consumption"—but including the other three search terms), will have a total weight of ¾. ¾ being higher than the quorum value ⅔, such documents will be included in the search result list.

Figure 3:
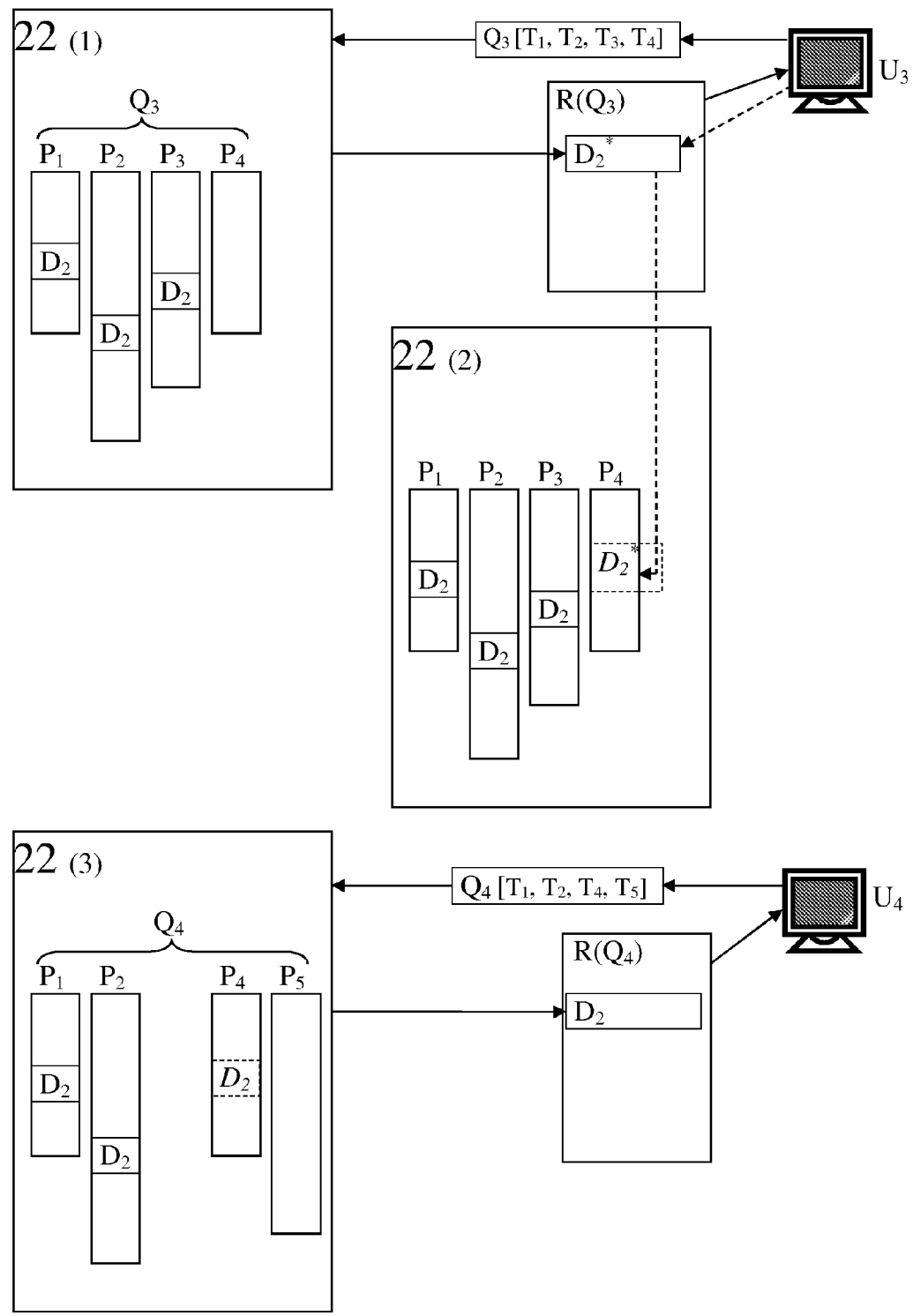
FIG. 3 shows an example of use of click-through information for inverted index enrichment according to one implementation of the present technology.

In FIG. 3, the above example is schematically shown by denoting the four search terms of query $Q_3$ as $T_1$ for 'hybrid', $T_2$ for 'cars', $T_3$ for 'fuel', $T_4$ for 'consumption', and their respective posting lists being $P_1$, $P_2$, $P_3$, $P_4$. A data item $D_2$, found in the first three posting lists but not in the fourth (that is, not including the word 'consumption'), is nevertheless included into the search result list $R(Q_3)$ of the query $Q_3$, by application of the simple quorum principle.

The issuer of the query $Q_3$, say $U_3$, when going through the search results list and reading the titles and snippets of the individual results, will likely disregard those data items that do not deal with "hybrid" cars, only with ordinary cars (such documents may have been included in the search result list because, while they lacked the search term "hybrid", they did contain the three other search terms of the query $Q_3$). By contrast, a data item about "hybrid car ratings fuel efficiency" (although not including the term 'consumption'), e.g. the above data item $D_2$, might attract their interest. Were they then to click on the hyperlink to open the data item $D_2$, this "click through" operation would be intercepted and recorded by the query server 18. Conventionally, a record of this click-through operation would likely be stored in the query database 24 to be used at a later time for better QSR-ranking of future queries' search results. In this implementation of present technology, this does not change.

However, in accordance with the present technology, in implementations thereof, irrespective of whether any click-through data is recorded in the query database 24 (as may have been the case in the prior art), the query server 18 (after having intercepted the click-through request from user $U_3$ for data item $D_2$) sends to the indexing server 16 (via a data path 52) a request to create a new posting for the data item $D_2$ in the posting list $P_4$ for the term "consumption". (Posting list $P_4$ does not then currently contain any "standard posting" for $D_2$ because $D_2$ does not contain any textual occurrence of term "consumption".) This "special" posting in $P_4$ can be thought of as follows: "Data item $D_2$ is considered as implicitly including the term 'consumption' because $D_2$ has been clicked-through in at least one query containing that search term". "Special" postings" of this kind will be called hereinafter "click-through postings", and a click-through posting of a document D in the posting-list of a term T will be sometimes denoted as "$CTP_{(T,D)}$", in contrast with standard postings denoted "$SP_{(T,D)}$". On FIG. 1 this additional activity of the indexing server 14, is shown by data path 54).

In this implementation, the indexing server 16 then creates a click-through posting as requested by the query server 18 in the posting list $P_4$ in the inverted index database 22, if one does not then currently exist already. If such a click-through posting then currently already existed in the posting list $P_4$ in the inverted index database 22, then in this implementation the indexing server 16 takes no further action in this regard. In other implementations (some of which are described in further detail herein below), should a click-through posting in respect of $D_2$ then already exist in posting list $P_4$, the indexing server 16 updates some information related to the click-through history of $D_2$ in such click-through posting (e.g. the number of times it has been clicked-through).

The action of creating a click-through posting for the document $D_2$ in the posting list $P_4$ is symbolically depicted in FIG. 3 by a box with dashed borders having italicized "$D_2$*", within the posting list $P_4$ in the second image of the inverted index database 22, denoted 22(2), in the middle of FIG. 3.

In order for the query server 18 to "know" that data $D_2$, (having been clicked through) lacks the term "consumption" while containing the other search terms of the query $Q_3$, query server 18 will have received such information from the search server 16, in some implementations, appended to the search result list. (For example, each data item number in the search list for a search query having various search terms could be complemented with a bit-map indicating in the order of the search terms in the query the presence or absence of those such terms in the data items.)

Alternatively, in other implementations, a request to create a click-through posting could be sent by the query server 18 to the indexing server 16 for each and every data item D clicked through, accompanied with the list of search terms of the search query to which the click-through relates. In such cases, the indexing server 14, when updating the inverted index 22, could verify the presence of the data item D in each of the posting lists for those terms, and create a click-through posting for D in those posting list for the term(s) lacking D.

Figure 4:
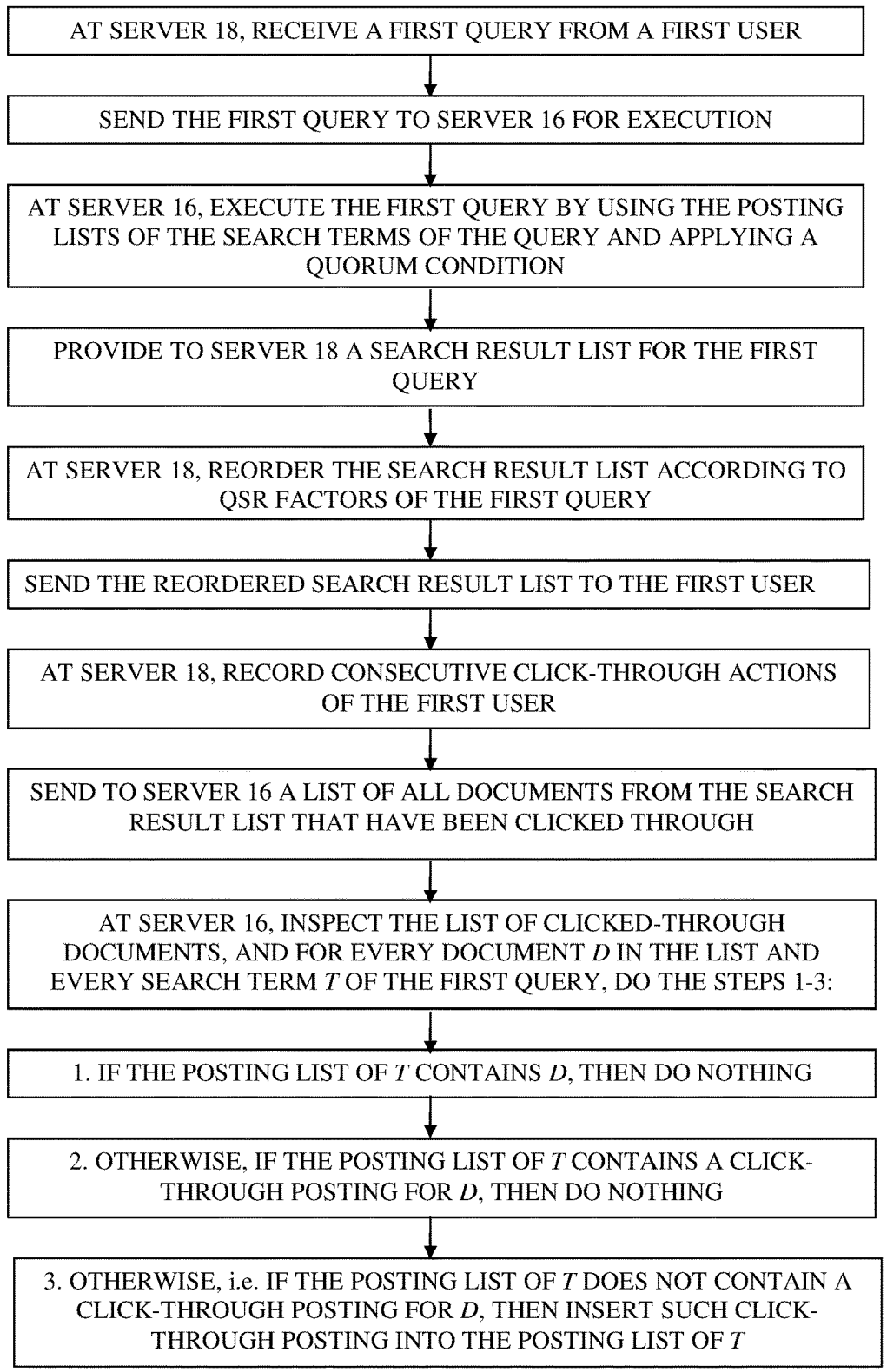
FIG. 4 presents a general flowchart of a query execution and inverted index enrichment according to one implementation of the present technology.

This sequence of actions is also shown on FIG. 4, which presents a typical flowchart of receiving a new search query by the query server 18, a search being executed by the searching server 16, providing the search requester with a search result list, recording by the query server 18 click-through actions by the search requester, sending the click-through data to the indexing server 14, and updating the inverted index appropriately, by the indexing server 14. Such an update of the inverted index may be called hereinafter its "enrichment".

Now another query $Q_4$ made by user $U_4$ (which may be the same user as $U_3$ or a different user), at a time not earlier than when the posting list for the term "consumption" has been effectively updated with the click-through posting for $D_2$ described above, will be considered. This new query $Q_4$ is "hybrid car consumption comparison". As was the case with query $Q_3$ ("hybrid cars fuel consumption"), query $Q_4$ has four terms, each weighted at ¼. Three of those terms are the same as $Q_3$, namely "hybrid", "cars", and "consumption", while the fourth is different: "fuel" in $Q_3$, and "comparison" in $Q_4$. Data item $D_2$, as was discussed above, contains both "hybrid" and "cars" but does not contain "consumption". For the purposes of the present example, it is to be assumed that $D_2$ does not contain the term "comparison" either.

Nevertheless, it is clear that the data item $D_2$ might be of interest to the search requester of $Q_4$ as $D_2$ talks about hybrid cars and about fuel (and hence implicitly about consumption), and most probably contains some comparison of hybrid cars in terms of their fuel consumption. In the prior art, data item $D_2$ would not be collected by the searching server 16 as a search result in respect of $Q_4$, because it textually contains only two of the query's four terms (i.e. "hybrid" and "cars"), and thus has a total weight of ½, which is less than the quorum value ⅔.

In implementations of the present technology, however, data item $D_2$ will be considered by the searching server 16 as (implicitly) containing a third one of the search terms (i.e. "consumption"), and hence will have a total weight of ¾, which is greater than the quorum value of %. $D_2$ will be included into the search result list for $Q_4$.

Figure 5:
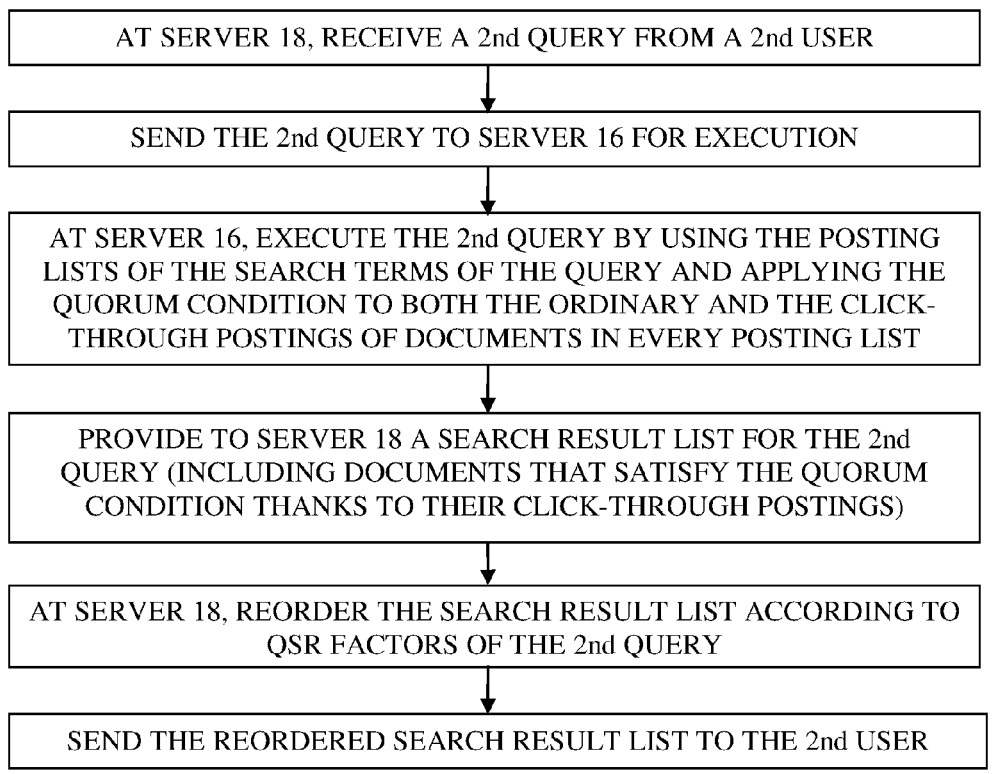
FIG. 5 is a continuation of the flowchart of FIG. 4, showing the use of an enriched inverted index in executing a next query, according to one implementation of the present technology.

The above explained principle of the present technology is illustratively shown in the bottom half of FIG. 3. In $Q_4$ the search term "comparison" is denoted by $T_5$, and its posting list by $P_5$. Data item $D_2$, being found in the posting lists of three out of the four search terms of query $Q_4$ (in one of them, namely in $P_4$, via the click-through posting shown in the dashed box in FIG. 3), will be selected and shown to the user $U_4$. Also, FIG. 5 (a continuation of FIG. 4) contains a flowchart of these later steps of the overall search procedure that ends with showing to the user a data item such as $D_2$ or similar items.

The above is a description of a very simple implementation of the present technology; more nuanced implementations are also possible. In this respect, continuing with the previous example, were data item $D_2$ to be clicked-through again (this time by user $U_4$ the search requester of query $Q_4$), then query server 18 would record this click-through action and would send to the indexing server 14 a request to create a second click-through posting for $D_2$, this time in posting list $P_5$ for the term "comparison".

Now, suppose that, after this second click-through posting for $D_2$ has been added to the posting list $P_5$, a third query $Q_5$ "electric cars consumption comparison" is received by query server 18 (whether from $U_4$ or from a different user). For present purposes, it is to be assumed that data item $D_2$ does not contain the term "electric"; that is, it deals with hybrid cars only. However, in the implementations of the present technology described above data item $D_2$ would be selected by the search server 16 as one of the search results in respect of $Q_5$, as it explicitly contains the term "cars" and also "implicitly" contains the terms "consumption" and "comparison" (through the two previously inserted click-through postings). Thus the total weight of $D_2$ in respect of $Q_5$ would be $3 \cdot 1/4 = 3/4$, which is greater than the quorum value of $2/3$. In this way, however, data items of potentially less relevance could appear in the search result list for $Q_5$, owing to their high proportion of "implicitly contained" search query terms (as compared with their "explicitly contained" search query terms).

To alleviate this potential problem, in other implementations of the present technology, each posting in each posting list of the inverted index 22 includes additional information to be used by the searching server 16 for distinguishing between standard postings and click-through postings. In its simplest form, such information can be a one-bit flag, having the value (for example) of "0" for a click-through posting and "1" for a standard posting. Alternatively, if the inverted index 22 is designed in a way that each posting for a data item D in a posting list for a term T contains a counter of the number of occurrences of T in D for example, a zero value of this counter can be used to indicate a click-through posting, instead of a separate one-bit flag as above.

Thus, the indexing server 14, for each click-through posting creation request received from the query server 18 creates a click-through posting that bears an indication of its implicit "click-through" nature. This indication (be it one of the two previously described variants, or otherwise) allows the searching server 16 to handle click-through postings in a different way than the way it handles standard postings. Here also, different options are possible, two of which are described hereinafter.

According to a first option, the quorum rule is supplemented with a requirement to count not more than a certain number or percentage of click-through postings (among the total number of postings found for a data item) when calculating the total "weight" of a document in a search for a given search query. For example the rule can be applied so as not to count more than one click-through posting out of every three or four postings, or not to count more than two click-through postings out of every five postings, etc. Thus, for example, permissible and impermissible click-through posting ratios could be created; e.g. ratios of 0:3 or 1:3 are permissible, ratios of 2:3 or 3:3 are not. Hence, in the previous example, data item $D_2$ would still be taken as a search result for the query $Q_4$ (one click-through posting and two ordinary postings, having of a permissible click-through posting ratio of 1:3), but not for the query $Q_5$ (two click-through postings and one ordinary posting, having a impermissible click-through posting ratio of 2:3).

A second option consists of employing a reduction factor in respect of click-through postings in the calculation of the total weight. For example, each click-through posting could be reduced by a factor of $2/3$, as opposed to standard postings which could have a no reduction factor. In this way, reconsidering the previous example of data item $D_2$, in respect of query $Q_4$, assuming a reduction factor of $2/3$ for click-through postings, the total weight of item $D_2$ would be $(1/4)+(1/4)+(2/3 \cdot 1/4) = 2/3$; thus the quorum value of $2/3$ would be attained. But in respect of query $Q_5$ the total weight of $D_2$ would be $(1/4)+(2/3 \cdot 1/4)+(2/3 \cdot 1/4) \approx 0.58$; thus the quorum value of $2/3$ (0.66) would not be attained.

The reduction factor need not be a constant as in the previous example. In other implantations it could be a variable. As an example, let NOC(T,D) be a counter counting the total number of times a document D has been clicked-through in the search results of different queries that include a term T not occurring in D. The value of this counter will only grow over time. An assumption can be made (which has been statistically verified) that higher the value of NOC(T,D), the higher the confidence that T really does "implicitly occur" in D.

In one implementation, the reduction factor should increase with the value of NOC(T,D), although it should never grow to a number greater than 1 (or it would no longer be a reduction factor). Thus, in one implementation the reduction factor can be defined as in the following function:

$$rf(T, D) = \frac{noc(T, D)}{noc(T, D) + 1}$$

In this manner, prior to any relevant click-throughs having occurred RF(T,D) will have an initial value of zero (0) (as NOC(T,D)=0) and with the first click-through NOC(T,D)=1 and RF(T,D) will become $1/2$. RF(T,D) will increase to $2/3$ when NOC(T,D)=2, to $3/4$ when NOC(T,D)=3, and so on. A reduction factor defined in this manner is only an example; any other suitably defined monotone increasing function of the number of click-throughs could be used (perhaps with slightly better or worse results in terms of final search result relevance to the user).

Applying a counter of the number of past click-throughs (such as the NOC counter as defined above) to the above examples of search queries $Q_3$, $Q_4$ and $Q_5$ (having a quorum value $2/3$), the following results would be obtained: Data item $D_2$ would only be considered as a search result for query $Q_4$ if there had been at least two previous click-throughs on $D_2$ in search queries containing the term "consumption" (For example query $Q_3$ and some other past query $Q_0$ ("fuel consumption levels of hybrid cars") that also had the data item $D_2$ as a search result which was then clicked-through by the search requester of $Q_0$.)

In such a case where there had been two past click-throughs on $D_2$ (for implicit occurrences of the term "consumption"), the reduction factor RF("consumption",$D_2$) would be $2/3$. Thus, the total weight of $D_2$ in respect of $Q_4$ would be equal to $(1/4)+(1/4)+(2/3 \cdot 1/4) = 2/3$, the same as in the original example. However, had there been only one past click-through, the total weight of $D_2$ in respect of $Q_4$ would be only $(1/4)+(1/4)+(1/2 \cdot 1/4) = 5/8$, which is less than quorum value of $2/3$.

In order to be used by the searching server 16 when performing search queries including the term T the above-described counter of click-throughs NOC(T,D) should be stored and maintained by the query server 18 or by the indexing server 14. In one implementation of the present technology, the counter of click-throughs NOC(T,D) is stored with (or within) the posting of D in the posting list of T. For example, in some conventional search engine configurations, the indexing server 14 may store in every standard posting ($SP_{(T,D)}$) of a data item D in a posting list for T, in addition to the data item number of D, the total number of occurrences of T in D (or some other function of the number of occurrences of T in D and of their particular distribution, e.g. of their presence in the "title" of the document). For click-through postings ($CTP_{(T,D)}$), in simple implementations of the present, that data field of a posting would be not used. In other implementations of the present technology, the indexing server 14 would store in that data field the number of previous clicks on D caused by "implicit occurrences" of T in D. In such implementations, the type of each posting (standard or click-through) is defined by a one-bit flag, as in one of the earlier implementations described above.

How this information stored and maintained by the indexing server 14 can be exploited by the searching server 16 will now be discussed in association with another implementation of the present technology. As was discussed above, in respect of any data item D in which a term T does not occur, a reduction factor RF(T,D) can be defined as set forth hereinabove. When defined in this manner, RF(T,D) is a monotone increasing function with a lower limit of 0 and an upper limit of 1. In the context of the description of this implementation, RF(T,D) will be called RFI(T,D) (which stands for the reduction factor in respect of implicit occurrences of term T in data item D. (The value of NOC(T,D) would typically be defined in the posting for D in the posting list for the term T—or some other appropriate counter stored in the posting $CTP_{(T,D)}$).

In any data item D in which a term T does occur, a function NOO(T,D) can be defined as the number of explicit occurrences of term T in data item D. (The value of NOO(T,D) would typically be defined in the posting for D in the posting list for the term T—or some other appropriate counter stored in the posting $SP_{(T,D)}$) Thus a reduction factor in respect of explicit occurrences RFE(T,D) can be similarly defined:

$$rfc(T, D) = \frac{noo(T, D)}{noo(T, D) + 1}$$

When defined in this manner, RFE, is also a monotone increasing function with a lower limit of 0 and an upper limit of 1.

A function IMP(T,D) can be defined, that shows, for every data item D and every search term T, the "importance" of term T in respect of D:

$$IMP(T,D)=RFE(T,D)+RFI(T,D).$$

Thus IMP(T,D)=0 for a data item D that neither explicitly contains a search term T nor had been clicked-through in a past query containing T. IMP(T,D) is itself a monotone increasing function with a lower limit of 0 and an upper limit of 1.

Turning to consider the formula for quorum calculation discussed in the background section hereinabove. For ease of reference that formula is reproduced below:

$$w(D,Q)=w(T_1,Q)\cdot occ(T_1,D)+w(T_2,Q)\cdot occ(T_2,D)+ \ldots +w(T_n,Q)\cdot occ(T_n,D)$$

where w(D,Q) is the function for determining the weight of a data item D in respect of a query $Q[T_1, T_2, \ldots T_n]$; each of $w(T_i,Q)$ is the weight of the term $T_i$ in respect of the query Q; and $occ(T_i,D)$ is a simple Boolean function indicating the "presence" of term T in a data item D. $occ(T_i,D)=0$ if the term T does not occur in data item D, and $occ(T_i,D)=1$ if the term T does occur in data item D.

In accordance with this implementation of the present technology, the above-noted formula can now be modified to take into account the effect of click-through postings and of the number of clicks-throughs, by replacing $occ(T_i,D)$ with the above-defined function IMP(T,D). The modified formula would then be:

$$w(D,Q)=w(T_1,Q)\cdot IMP(T_1,D)+w(T_2,Q)\cdot IMP(T_2,D)+ \ldots +w(T_n,Q)\cdot IMP(T_n,D)$$

In this modified formula, every term $w(T_i,Q)\cdot IMP(T_i,D)$ is a product of two values. The first value is the weight of the term $T_i$ in respect of the search query Q and thus shows the importance of the term $T_i$ in respect of the search query Q. The second value is the value of IMP(T,D) function and shows the importance of the term $T_i$ with respect to data item D.

Assuming that the threshold quorum value is $w_q$, then every data item D with a total weight equal to or greater than the threshold quorum value (i.e. $w(D,Q) \geq w_q$) will be considered by the searching server 16 as a search result for the search query Q.

One final important remark concerns the timing of execution by the indexing server 14 of the updates to the inverted index 22 requested to be made by the query server 18 (as was discussed hereinabove). It was already mentioned above that conventional updates for inclusion of new documents into the inverted index 22 are typically not performed one at a time, but rather are grouped into batches to be performed periodically at once. This is because processing every new data item D involves not only creating another posting in the posting list of every term T occurring in D, but also updating data item numbers of all documents of a lesser QIR than that of D (and thus having a data item number less than that of D), and this must be done everywhere throughout the inverted index 22. Grouping such update operations for several new data items into batches helps significantly reduce the total update time, which is important as during that time the inverted index 22, or at least one of its replicas, is unavailable for search operations.

In contrast with this relatively "heavy" processing of new data items by the indexing server 14, processing of new click-through requests from the query server 18 to the indexing server 14 in accordance with the present technology requires less processing power and time as it does not require any data item renumbering. However, as posting lists are typically stored in an encoded form in order to reduce the amount of storage space they require, inserting a new posting somewhere in the middle of a posting list can only be done by the sequential decoding and re-encoding of several consecutive segments of that posting list. This is itself a time-consuming operation that also makes the posting list temporarily unavailable for searching operations.

For this reason, in at least some implementations of the present technology, updating operations on the inverted index 22 in respect of newly generated click-through data are performed not one by one, but are also grouped into batches. Performance of a batch of click-through update requests is preferably done by the indexing server 14 at the same time as it performs a batch processing of new documents. In this way, the total processing time will be less than were both batches to be processed separately.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method of searching an inverted index having a plurality of posting lists, the method comprising:
   receiving, from a first client device by at least one server, a first search query to be searched, the first search query including a first plurality of search terms, the first plurality of search terms comprising a first term;
   effecting, by the at least one server, a first search of a first plurality of posting lists to yield first search results, each of the first plurality of posting lists associated with a one of the first plurality of search terms, the first plurality of posting lists comprising a first posting list associated with the first term,
      each of the first plurality of posting lists including a plurality of a first type of postings, the first type of postings being a reference to a data item actually containing the search term with which that posting list is associated,
      the first search results including a first plurality of result items, the first search results including a result item missing the first term;
   sending, by the at least one server to the first client device, at least a portion of the first search results including the result item missing the first term;
   receiving, from the first client device by the at least one server, an indication of a first user-selected result item, the first user-selected result item being the result item missing the first term, and
      the first user-selected result item having been selected by the user from the first search results;
   effecting, by the at least one server, insertion of a reference to the first user-selected result item into the first posting list that is associated with the first term even though the first user-selected result item misses the first term, the reference to the first user-selected result item being a second-type of posting; and
   storing, by at least one server, the first posting list with the inserted second-type of posting.

2. The computer-implemented method of claim 1, further comprising:
   receiving, from a second client device by the at least one server, a second search query to be searched, the second search query containing a second plurality of search terms, one of the second plurality of search terms being the first term;
   effecting, by the at least one server, a second search of a second plurality of posting lists to yield second search results, each of the second plurality of posting lists associated with a one of the second plurality of search terms, one of the second plurality of posting lists being the posting list associated with the first term and including the second-type of posting, and the second search including a consideration of the second-type of posting.

3. The computer-implemented method of claim 2, wherein, as a result of the consideration of the second-type of posting, the second search results include the first user-selected result item of the first search results.

4. The computer-implemented method of claim 2, wherein effecting the second search includes assigning an item weight to each data item being considered during the second search; and each data item is included in the second search results only if its item weight is not less than a threshold item weight.

5. The computer-implemented method of claim 4, wherein each one of the second plurality of search terms is assigned a search term weight; and wherein calculation of the item weight of each data item being considered includes a sum of the search term weights of those ones of the second plurality of search terms having one of the first-type of posting and the second-type of posting in respect of that data item in the one of the second plurality of posting lists associated with that one of the second plurality of search terms.

6. The computer-implemented method of claim 4, wherein calculation of the item weight for each data item being considered includes a sum of a plurality of addends, the addends in respect of the first-type of postings being the search term weights of those ones of the second plurality of search terms having one of the first type of posting in respect of that data item in the one of the second plurality of posting lists associated with that one of the second plurality of search terms multiplied by a first-type of reduction factor in respect of that addend, the addends in respect of the second-type of posting being the search term weights of those ones of the second plurality of search terms having one of the second type of posting in respect of that data item in the one of the second plurality of posting lists associated with that one of the second plurality of search terms.

7. The computer-implemented method of claim 4, wherein calculation of the item weight for each data item being considered includes a sum of a plurality of addends, the addends in respect of the first-type of postings being the search term weights of those ones of the second plurality of search terms having one of the first type of posting in respect of that data item in the one of the second plurality of posting lists associated with that one of the second plurality of search terms, the addends in respect of the second-type of posting being the search term weights of those ones of the second plurality of search terms having one of the second type of posting in respect of that data item in the one of the second plurality of posting lists associated with that one of the second plurality of search terms multiplied by a second-type of reduction factor in respect of that addend.

8. The computer-implemented method of claim 4, wherein calculation of the item weight for each data item being considered includes a sum of a plurality of addends, the addends in respect of the first-type of postings being the search term weights of those ones of the second plurality of search terms having one of the first type of posting in respect of that data item in the one of the second plurality of posting lists associated with that one of the second plurality of search terms multiplied by a first-type of reduction factor in respect of that addend, the addends in respect of the second-type of posting being the search term weights of those ones of the second plurality of search terms having one of the second type of posting in respect of that data item in the one of the second plurality of posting lists associated with that one of the second plurality of search terms multiplied by a second-type of reduction factor in respect of that addend.

9. The computer-implemented method of claim 7, wherein the second-type of reduction factor in respect of that addend is a function of a number of times that data item had been clicked-through in search results of previous search queries including the search term with which that one of the second plurality of posting lists is associated.

10. The computer-implemented method of claim 6, wherein the first-type of reduction factor in respect of that addend is a function of a number of times that data item contains the search term with which that one of the second plurality of posting lists is associated.

11. The computer-implemented method of claim 2, wherein a data item is included in the second search results only if a ratio of its second-type postings to its first-type postings is not greater than a threshold ratio.

12. The computer-implemented method of claim 2, further comprising:
sending, by the at least one server to the second client device, at least a portion of the second search results including the first user-selected result item;
receiving, from the second client device by the at least one server, an indication of a second user-selected result item, the second user-selected result item being the first user-selected result item;
effecting, by the at least one server, modification in the posting list associated with the missing one of the second plurality of search terms of the second-type of posting to the first user-selected result item, to take into account that the first user-selected result item is also the second user-selected result item.

13. A system comprising at least one server, the at least one server having at least one computer processor, and a non-transient computer information storage medium storing program instructions that when executed by the at least one computer processor effect:
receiving, from a first client device by at least one server, a first search query to be searched, the first search query including a first plurality of search terms, the first plurality of search terms comprising a first term;
effecting, by the at least one server, a first search of a first plurality of posting lists to yield first search results, each of the first plurality of posting lists associated with a one of the first plurality of search terms, the first plurality of posting lists comprising a first posting list associated with the first term,
each of the first plurality of posting lists including a plurality of a first type of postings, the first type of postings being a reference to a data item actually containing the search term with which that posting list is associated,
the first search results including a first plurality of result items, the first search results including
a result item missing the first term;
sending, by the at least one server to the first client device, at least a portion of the first search results including the result item missing the first term;
receiving, from the first client device by the at least one server, an indication of a first user-selected result item, the first user-selected result item being the result item missing the first term, and
the first user-selected result item having been selected by the user from the first search results;
effecting, by the at least one server, insertion of a reference to the first user-selected result item into the first posting list that is associated with the first term even though the first user-selected result item misses the first term, the reference to the first user-selected result item being a second-type of posting; and
storing, by at least one server, the first posting list with the inserted second-type of posting.

14. The system of claim 13, wherein the non-transient computer information storage medium further stores program instructions that when executed by the at least one computer processor effect:
receiving, from a second client device by the at least one server, a second search query to be searched, the second search query containing a second plurality of search terms, one of the second plurality of search terms being the first term; and effecting, by the at least one server, a second search of a second plurality of posting lists to yield second search results, each of the second plurality of posting lists associated with a one of the second plurality of search terms, one of the second plurality of posting lists being the posting list associated with the first term and including the second-type of posting, and the second search including a consideration of the second-type of posting.

15. The system of claim 14, wherein, as a result of the consideration of the second-type of posting, the second search results include the first user-selected result item of the first search results.

16. The system of claim 14, wherein effecting the second search includes assigning an item weight to each data item being considered during the second search; and each data item is included in the second search results only if its item weight is not less than a threshold item weight.

17. The system of claim 16, wherein each one of the second plurality of search terms is assigned a search term weight; and wherein calculation of the item weight of each data item being considered includes a sum of the search term weights of those ones of the second plurality of search terms having one of the first-type of posting and the second-type of posting in respect of that data item in the one of the second plurality of posting lists associated with that one of the second plurality of search terms.

18. The system of claim 16, wherein calculation of the item weight for each data item being considered includes a sum of a plurality of addends, the addends in respect of the first-type of postings being the search term weights of those ones of the second plurality of search terms having one of the first type of posting in respect of that data item in the one of the second plurality of posting lists associated with that one of the second plurality of search terms multiplied by a first-type of reduction factor in respect of that addend, the addends in respect of the second-type of posting being the search term weights of those ones of the second plurality of search terms having one of the second type of posting in respect of that data item in the one of the second plurality of posting lists associated with that one of the second plurality of search terms.

19. The system of claim 16, wherein calculation of the item weight for each data item being considered includes a sum of a plurality of addends, the addends in respect of the first-type of postings being the search term weights of those ones of the second plurality of search terms having one of the first type of posting in respect of that data item in the one of the second plurality of posting lists associated with that one of the second plurality of search terms, the addends in respect of the second-type of posting being the search term weights of those ones of the second plurality of search terms having one of the second type of posting in respect of that data item in the one of the second plurality of posting lists associated with that one of the second plurality of search terms multiplied by a second-type of reduction factor in respect of that addend.

20. The system of claim 16, wherein calculation of the item weight for each data item being considered includes a sum of a plurality of addends, the addends in respect of the first-type of postings being the search term weights of those ones of the second plurality of search terms having one of the first type of posting in respect of that data item in the one of the second plurality of posting lists associated with that one of the second plurality of search terms multiplied by a first-type of reduction factor in respect of that addend, the addends in respect of the second-type of posting being the search term weights of those ones of the second plurality of search terms having one of the second type of posting in respect of that data item in the one of the second plurality of posting lists associated with that one of the second plurality of search terms multiplied by a second-type of reduction factor in respect of that addend.

21. The system of claim 19, wherein the second-type of reduction factor in respect of that addend is a function of a number of times that data item had been clicked-through in search results of previous search queries including the search term with which that one of the second plurality of posting lists is associated.

22. The system of claim 18, wherein the first-type of reduction factor in respect of that addend is a function of a number of times that data item contains the search term with which that one of the second plurality of posting lists is associated.

23. The system of claim 14, wherein a data item is included in the second search results only if a ratio of its second-type postings to its first-type postings is not greater than a threshold ratio.

24. The system of claim 14, wherein the non-transient computer information storage medium further stores program instructions that when executed by the at least one computer processor effect:
- sending, by the at least one server to the second client device, at least a portion of the second search results including the first user-selected result item;
- receiving, from the second client device by the at least one server, an indication of a second user-selected result item, the second user-selected result item being the first user-selected result item;
- effecting, by the at least one server, modification in the posting list associated with the missing one of the second plurality of search terms of the second-type of posting to the first user-selected result item, to take into account that the first user-selected result item is also the second user-selected result item.

* * * * *